(12) United States Patent
Alexander

(10) Patent No.: US 12,551,839 B2
(45) Date of Patent: Feb. 17, 2026

(54) TRANSPORTABLE CARBON DIOXIDE CAPTURE DEVICE AND METHOD

(71) Applicant: Populace, LLC, Spokane, WA (US)

(72) Inventor: Brynne Erin Impett Alexander, Seattle, WA (US)

(73) Assignee: Populace, LLC, Spokane, WA (US)

( * ) Notice: Subject to any disclaimer, the term of this patent is extended or adjusted under 35 U.S.C. 154(b) by 369 days.

(21) Appl. No.: 18/451,649

(22) Filed: Aug. 17, 2023

(65) Prior Publication Data
US 2024/0058739 A1  Feb. 22, 2024

Related U.S. Application Data

(60) Provisional application No. 63/371,794, filed on Aug. 18, 2022.

(51) Int. Cl.
*B01D 53/04* (2006.01)
*B60P 3/00* (2006.01)

(52) U.S. Cl.
CPC ..... *B01D 53/0454* (2013.01); *B01D 53/0415* (2013.01); *B01D 53/0446* (2013.01); *B60P 3/00* (2013.01); *B01D 2259/4558* (2013.01); *B01D 2259/4566* (2013.01)

(58) Field of Classification Search
CPC ........... B01D 53/04; B01D 53/0454; B01D 53/0415; B01D 53/0446; B01D 53/0407; B01D 53/047; B01D 2259/4558; B01D 2259/4566; B60P 3/005; B60P 3/00
USPC .... 95/8, 11, 95–104, 139, 148; 96/108, 109, 96/111, 121, 122, 147, 148, 236; 423/220, 230, 228, 229
See application file for complete search history.

(56) References Cited

U.S. PATENT DOCUMENTS

| | | | | |
|---|---|---|---|---|
| 3,751,878 A | * | 8/1973 | Collins | C07C 7/13 |
| | | | | 95/139 |
| 6,436,175 B1 | * | 8/2002 | Coates | B01D 53/0423 |
| | | | | 96/152 |
| 7,914,758 B2 | | 3/2011 | Murray et al. | |
| 7,947,118 B2 | * | 5/2011 | Rarig | B01D 53/047 |
| | | | | 96/147 |
| 11,766,636 B1 | * | 9/2023 | Besarati | B01D 53/0462 |
| | | | | 95/90 |
| 2002/0083833 A1 | * | 7/2002 | Nalette | B01J 20/3208 |
| | | | | 95/139 |

(Continued)

OTHER PUBLICATIONS

Aramco; "Transport technologies Mobile Carbon Capture"; https://www.aramco.com/en/creating-value/technology-development/transport-technologies/mobile-carbon-capture—available at least as early as Jul. 29, 2022.

(Continued)

*Primary Examiner* — Frank M Lawrence, Jr.
(74) *Attorney, Agent, or Firm* — Morgan, Lewis & Bockius LLP (57) ABSTRACT

A transportable carbon dioxide capture device includes a container configured to be attached to a vehicle. The container includes an air intake in fluid communication with ambient air. There is a carbon dioxide sorbent positioned within the container, a carbon dioxide compressor positioned within the container and in fluid communication with the carbon dioxide sorbent, and a carbon dioxide storage container positioned within the container and in fluid communication with the carbon dioxide compressor.

19 Claims, 3 Drawing Sheets (56) References Cited

U.S. PATENT DOCUMENTS

2011/0189075 A1* 8/2011 Wright .................. B01D 53/62
                                                                502/55
2012/0304858 A1   12/2012 Wright et al.
2024/0198278 A1*  6/2024 Scotti ................. B01D 53/0462

OTHER PUBLICATIONS

Lockett, "The World's First Carbon Negative Car"; https://medium.com/predict/the-worlds-first-carbon-negative-car-47fd4c5557e6—published Jul. 30, 2022.

* cited by examiner

TRANSPORTABLE CARBON DIOXIDE CAPTURE DEVICE AND METHOD

CROSS-REFERENCE TO RELATED APPLICATIONS

This application claims the benefit of U.S. Provisional Patent Application No. 63/371,794 filed Aug. 18, 2022 entitled "Transportable Carbon Dioxide Capture Device and Method", which is incorporated by reference herein in its entirety.

TECHNICAL FIELD

The present disclosure generally relates to carbon dioxide capture devices and methods and, in some embodiments, to a transportable device attachable to a vehicle or other transportation means for capturing carbon dioxide from ambient air.

SUMMARY

In one embodiment there is a transportable carbon dioxide capture device including a container configured to be attached to a vehicle, the container including an air intake in fluid communication with ambient air, a carbon dioxide sorbent positioned within the container, a carbon dioxide compressor positioned within the container and in fluid communication with the carbon dioxide sorbent, and a carbon dioxide storage container positioned within the container and in fluid communication with the carbon dioxide compressor.

In some embodiments, the carbon dioxide sorbent is selectively adjustable between an activated configuration and a deactivated configuration and in the activated configuration the carbon dioxide sorbent is in fluid communication with air flowing through the at least one air intake and in the deactivated configuration air flowing through the air intake is prevented from contacting the carbon dioxide sorbent. In some embodiments, the carbon dioxide sorbent includes a first sorbent and a second sorbent each being configured to transition between the activated and deactivated configurations independent of one another.

In some embodiments, the transportable carbon dioxide capture device further includes one or more sensors in communication with a controller, the one or more sensors configured to transmit data relating to a state of the first and second sorbent to the controller and the controller is configured to transition the first and second sorbent between the activated and deactivated configurations based on the state of the first and second sorbents. In some embodiments, in the deactivated configuration, captured carbon dioxide is transferred from the carbon dioxide sorbent to the carbon dioxide compressor. In some embodiments, the transportable carbon dioxide capture device further includes a fluid container positioned within the container, the fluid container in fluid communication with the carbon dioxide sorbent and the at least one carbon dioxide sorbent is a moisture swing sorbent.

In some embodiments, the carbon dioxide sorbent includes a plurality of carbon dioxide sorbents each in fluid communication with the carbon dioxide compressor. In some embodiments, the carbon dioxide storage container includes a plurality of carbon dioxide storage containers each in fluid communication with the carbon dioxide compressor. In some embodiments, the container is separated from an exhaust system of the vehicle.

In another embodiment there is a transportable carbon dioxide capture device including an enclosed container configured to be attached to a vehicle, the enclosed container including an air intake in fluid communication with ambient air and an interior space of the enclosed container, a plurality of moisture swing sorbents positioned within the enclosed container, one or more sensors positioned within the enclosed container and in communication with a controller, the one or more sensors configured to transmit data relating to a state of each moisture swing sorbent of the plurality of moisture swing sorbents to the controller, the controller configured to selectively activate and deactivate each of the moisture swing sorbents based on the data received from the one or more sensors, a fluid container positioned within the enclosed container, the fluid container in fluid communication with the plurality of moisture swing sorbents and configured to selectively pump fluid contained within the fluid container to individual moisture swing sorbents of the plurality of moisture swing sorbents, a carbon dioxide compressor positioned within the enclosed container and in fluid communication with the plurality of moisture swing sorbents, and a plurality of carbon dioxide storage containers positioned within the enclosed container and in fluid communication with the carbon dioxide compressor. When activated the moisture swing sorbents are in fluid communication with air flowing through the at least one air intake and when the moisture swing sorbents are deactivated air flowing through the at least one air intake is prevented from contacting the respective moisture swing sorbent.

In some embodiments, the container and the plurality of moisture swing sorbents are separated from an exhaust system of the vehicle.

In another embodiment, there is a carbon dioxide capture vehicle operable by a user to initiate and control movement of the vehicle and the vehicle includes a cabin having one or more user-operable control units to allow a user to initiate and control movement of the vehicle, a container coupled to the cabin and positioned at least partially behind the cabin and having a top surface positioned above a roof of the cabin, the container including an air intake in fluid communication with ambient air and an interior space of the container, a carbon dioxide sorbent positioned within the container, a carbon dioxide compressor positioned within the container and in fluid communication with the carbon dioxide sorbent, and a carbon dioxide storage containers positioned within the container and in fluid communication with the carbon dioxide compressor.

In some embodiments, the carbon dioxide sorbent is selectively adjustable between an activated and deactivated configuration, and in the activated configuration the carbon dioxide sorbent is in fluid communication with air flowing through the air intake and in the deactivated configuration captured carbon dioxide is transferred from the at least one sorbent to the carbon dioxide compressor. In some embodiments, the carbon dioxide sorbent includes a first sorbent and a second sorbent each being configured to transition between the activated and deactivated configurations independent of one another. In some embodiments, the vehicle further includes one or more sensors in communication with a controller, the one or more sensors configured to transmit data relating to a state of the first and second sorbent to the controller, and the controller is configured to transition the first and second sorbent between the activated and deactivated configurations based on the state of the first and second sorbents.

In some embodiments, the vehicle is one of: an electric automobile, an unmanned aerial vehicle, a train, or a boat. In some embodiments, the at least one air intake is positioned at least partially above the roof of the cabin. In some embodiments, there is a method of operating the vehicle that includes initiating movement of the vehicle such that ambient air external to the container flows through the at least one air intake, into the container, and contacts the at least one carbon dioxide sorbent causing the at least one carbon dioxide sorbent to automatically capture carbon dioxide from the ambient air within the container. In some embodiments, the method further includes causing the at least one carbon dioxide sorbent to release a first amount of captured carbon dioxide to the carbon dioxide compressor, automatically compressing the first amount of captured carbon dioxide at the carbon dioxide compressor, transferring the compressed first amount of captured carbon dioxide to the one or more carbon dioxide storage containers, and capturing a second amount of carbon dioxide via the at least one sorbent. In some embodiments, the releasing, compressing and transferring of the first amount of captured carbon dioxide is performed external to the vehicle and the container.

BRIEF DESCRIPTION OF THE DRAWINGS

The following detailed description of embodiments of the transportable carbon dioxide capture device and method, will be better understood when read in conjunction with the appended drawings of exemplary embodiments. It should be understood, however, that the invention is not limited to the precise arrangements and instrumentalities shown.

In the drawings.

DETAILED DESCRIPTION

Existing carbon dioxide ("$CO_2$") capturing devices require large amounts of land an infrastructure in order to capture $CO_2$ from ambient air. Existing devices are often housed in buildings referred to as direct air capture ("DAC") facilities or buildings. However, such DAC facilities require a significant amount of space and/or land to be built. Finding space and/or land for such facilities poses significant problems one of which being that acquiring space and/or land in areas where $CO_2$ concentration or generation is very low. Finding space and/or land is made difficult based on the available land in a given area (e.g., it is more difficult to find space in densely populated areas) and because residents often object to these facilities being built near their homes. As such, these facilities are typically built far away from areas having large and/or dense populations where $CO_2$ generation is more highly concentrated. Additionally, once built, it is impossible or at least extremely difficult, time consuming and costly to move a facility to another location. Similarly, it is very expensive and/or difficult to build more facilities of a similar nature because of the reasons outlined above. Therefore, there is a need to provide a $CO_2$ capture device that is easily transportable, easily scalable and can operate within areas of high $CO_2$ generation.

Figure 1A:
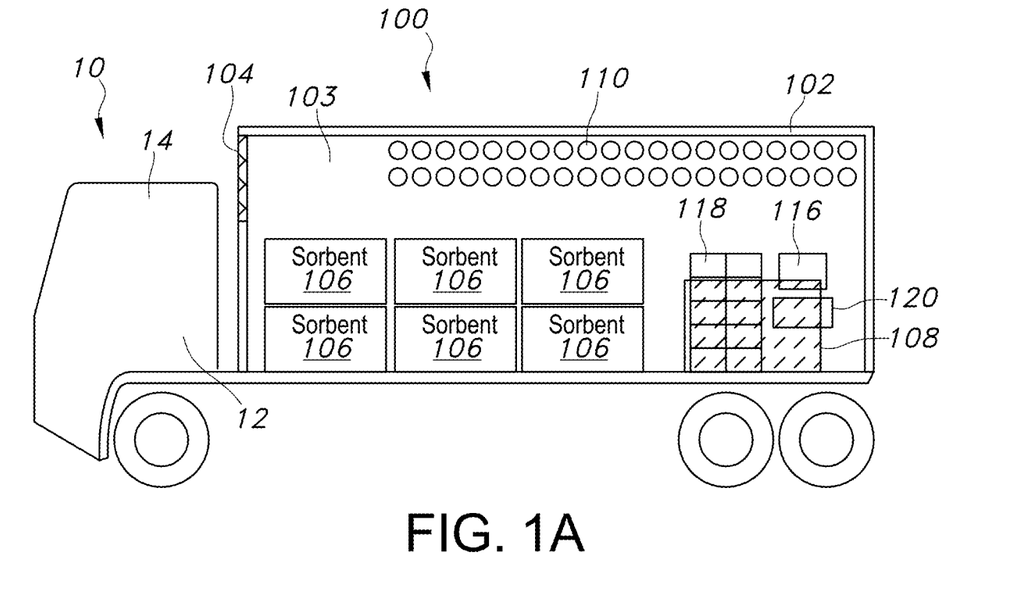
FIG. 1A is a side cross sectional/schematic view of a vehicle including a transportable carbon dioxide capture device in accordance with an exemplary embodiment of the present disclosure.
Figure 1B:
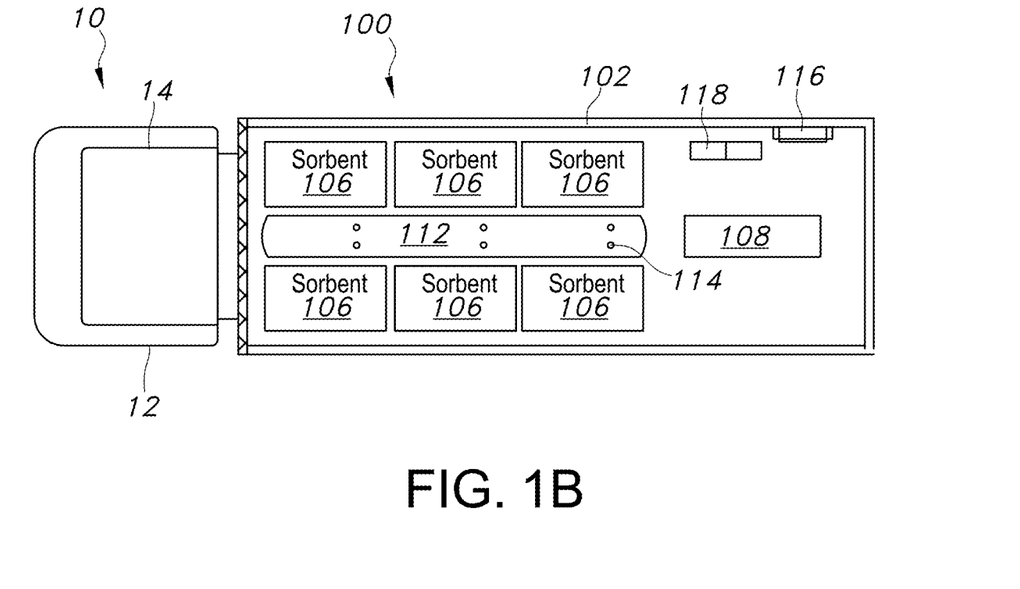
FIG. 1B is a top cross sectional/schematic view of the vehicle of FIG. 1A.

Referring to the drawings in detail, wherein like reference numerals indicate like elements throughout, there is shown in FIGS. 1A-1B a vehicle having attached thereto a transportable carbon dioxide capture device, generally designated 100, or $CO_2$ capture device 100 for short, in accordance with an exemplary embodiment of the present invention. The $CO_2$ capture device 100 may be attached to or configured to be attached to a vehicle such that the $CO_2$ capture device may be transportable or mobile. The $CO_2$ capture device 100 may be operable while being transported such that during transportation (e.g., during operation/movement of the vehicle it is attached to) the $CO_2$ capture device 100 may capture $CO_2$ from ambient air moving over and/or around the $CO_2$ capture device 100 during transportation. In some embodiments, the $CO_2$ capture device 100 may capture $CO_2$ from ambient air that surrounds the $CO_2$ capture device 100 during transportation by drawing in the surrounding ambient air through one or more air intakes. The $CO_2$ capture device 100 of the present disclosure is not restricted to a single location and can be used close proximity to combustion vehicles and in urban locations. In this manner, the $CO_2$ capture device 100 of the present disclosure may be operable in areas having dense carbon dioxide emissions. An area having a dense $CO_2$ emission may an area or space with a $CO_2$ density greater than about 410 parts per million (ppm), greater than 600 ppm, greater than 700 ppm, greater than 1000 ppm, greater than 2000 ppm or greater than 5000 ppm.

Referring to FIGS. 1A-1B, there is shown the $CO_2$ capture device 100 coupled to a vehicle 10. The $CO_2$ capture device 100 may include a container 102 configured to be attached to the vehicle 10. The container 102 may be a structure configured to house various components of the $CO_2$ capture device 100 and to allow ambient air to flow into the container 102. The vehicle 10 may be any vehicle suitable for transporting at least one container 102 and the components positioned therein. In FIGS. 1A-1B the vehicle 10 and container 100 are illustrated as being a box truck, however it will be understood that other vehicles or other devices for transportation may be used. For example, the vehicle 10 may be a train, a subway car, a boat, any form of automobile, any form aerial vehicle, or any other manned or unmanned transportation vehicles. In a preferred embodiment, the vehicle 10 is an electric vehicle (EV) that is powered by a stored electrical charge. In some embodiments, the vehicle 10 may be a class 6 EV truck.

The container 102 may be coupled to the vehicle 10 and positioned behind a cabin 12 of the vehicle. The cabin 12 may have one or more user-operable control units (e.g., throttle controls, steering wheel, brake pedal, gas pedal) to allow a user to control movement of the vehicle 10. The container 102 may be coupled to the cabin 12 and positioned at least partially behind the cabin 12. The container 102 may define an interior space 103 within which one or more components of the $CO_2$ capture device 100 may be positioned. In some embodiments, the container 102 is configured to allow ambient air to enter into the interior space 103 of the container 102 such that carbon dioxide may be captured from the ambient air that flows into the container 102. Ambient air refers to air that is external to the vehicle 10 (e.g., air that flow over and/or around the cabin 12 when the vehicle 10 is moving).

The container 102 may include at least one air intake 104 in fluid communication with ambient air. For example, the container 102 may include an air intake 104 positioned at a front of the container 102 and at least partially above a roof 14 of the cabin 12. Ambient air may enter into the interior space 103 of the container 102 via the at least one air intake 104 during, for example, operation and/or movement of the vehicle 10. Although a single air intake 104 is illustrated in FIGS. 1A-1B, the $CO_2$ capture device 100 may include more than one air intake coupled to the container 102. For example, there may be multiple air intakes 104 positioned at the front of the container 102. The air intakes 104 may be a grill, a pipe, a vent or any other suitable form of air intake. In some embodiments, there are one or more filters attached to the air intake 104 to prevent debris and/or particulates from entering into the container 102. In some embodiments, the air intake 104 is in fluid communication with a grill of the vehicle 10 (e.g., at the front of the cab) such that air entering into the grill is directed to the container 102. Although the air intake 104 illustrated in FIGS. 1A-1B is generally rectangular in shape, it will be understood that the air intake 104 may have a desired shape.

In some embodiments, there may be one or more flaps or adjustable covers coupled to the air intake 104 that are configured to selectively open and close to control airflow through the air intake 104. For example, a flap coupled to the air intake 104 when closed may at least partially cover the air intake 104 and restrict fluid communication between the air intake 104 and the ambient air. When the flap is opened, the air intake 104 may be in fluid communication with ambient air 104. In some embodiments, the flap is automatically controlled to open and close. For example, the flap may be coupled to a motor that when powered causes the flap to be displaced relative to the air intake 104. In some instances, the flap is positioned within the interior space 103 of the container 102. In other embodiments, the flap is positioned on an exterior surface of the container 102. In some instances, there are flaps coupled to the air intake both within the interior space and on an exterior surface of the container 102. In some instances, flaps covering the air intake may be configured to open when the vehicle 10 is slowed to direct airflow through the air intake 104. For example, there may be one or more flaps (not shown) coupled to the container 102 proximate the air intake 104 that when the vehicle 10 is slowed (e.g., during braking) the flaps extend outwardly from the container 102 and/or air intake 104 to direct additional airflow to the air intake 104. The flaps may have a first state in which they do not direct air flow to the air intake 104 and a second state where they do direct air flow to the air intake 104. As such, when brakes of the vehicle 10 are engaged, the flaps may automatically (e.g., mechanically and/or through a controller) transition from the first state to the second state. In some embodiments, the flaps may generate additional drag on the vehicle 10 during braking, or generally deceleration, in order to prolong the life of the braking system of the vehicle 10.

The one or more air intakes 104 may be positioned on the container 102 at any desired location to reduce moisture from entering into the container 102 and generating drag during movement of the vehicle 10. In some embodiments, there may be one or more air intakes 104 positioned on a top surface of the container 102, and/or one or more of the side surfaces of the container 102. In some embodiments, the air intake 104 may be selectively opened or closed to selectively allow or prevent ambient air from flowing into the container 102 via the air intake. For example, the container 102 may include shutters, vents, flaps, or any other conventional devices for restricting airflow through the air intake 104, as discussed above.

The $CO_2$ capture device 100 may include one or more sorbents 106 (e.g., materials for absorbing or adsorbing liquids or gases) for capturing $CO_2$ from ambient air that flows through the air intake 104. The one or more sorbents 106 may be, in a preferred embodiment, moisture swing sorbents, however any other suitable $CO_2$ sorbent may be used. For example, the sorbents 106 may be solid sorbents for carbon capture, activated carbon, modified activated carbon, zeolite, metal-organic frame (MOF), amine grafted sorbents on silica support, pressure swing sorbents and/or thermal regenerative sorbents. In some embodiments, there may be one or more carbon dioxide sorbents 106, or sorbents 106 for short, configured to capture carbon dioxide from the ambient air that flows into the container 102. For example, the carbon dioxide sorbents 106 may be positioned within the container 102 and in fluid communication with ambient air that flows into the container through the at least one air intake 104.

In some embodiments, there may be a plurality of carbon dioxide sorbents 106 positioned within the container 102. For example, there may be between one to twenty sorbents 106 positioned within the container 102 and in fluid communication with ambient air flowing into the container 102 via the air intake 104. In some embodiments, there are between about six to about eight sorbents 106 positioned within the container 102. In some embodiments, each sorbent 106 may be generally the same size. The sorbents 106 may have a width of about 2 feet, a height of about 2 feet, and a length of about 3 feet. The size and/or number of sorbents 106 included in the $CO_2$ capture device 100 may vary based on the container 102 they are positioned within, the type of sorbent used, and/or the type of vehicle transporting the container 102. In some embodiments, the number and size of the sorbents 106 may be altered to increase the efficiency and/or rate of $CO_2$ capture. By providing one or more $CO_2$ sorbents 106 in fluid communication with ambient air flowing through the air intake 104, the $CO_2$ capture device 100 of the present disclosure may provide a more power efficient $CO_2$ capture when compared to conventional systems. For example, in DAC facilities for capturing $CO_2$, a large number of fans are required to be powered in order to draw air into the facility to be captured. However, the $CO_2$ capture device 100 of the present disclosure facilitates $CO_2$ capture via the air flow generated from initiating movement of the vehicle 10.

The $CO_2$ capture device 100 may include a $CO_2$ compressor 108 positioned within the container 102 and in fluid communication with the $CO_2$ sorbents 106. For example, there may be one or more fluid communication devices or structures (e.g., pipes, tubes) connecting each of the sorbents 106 to the $CO_2$ compressor 108. The $CO_2$ compressor 108 may be configured to receive captured $CO_2$ from the sorbents 106 and compress the captured $CO_2$ for storage. The $CO_2$ compressor 108 may be any suitable $CO_2$ compressor 108 and may be positioned within the container 102 in compliance with any existing safety regulations. For example, the $CO_2$ compressor 108 may be positioned within the container 102 away from any exterior walls of the container 102 to prevent impacts (e.g., from vehicle collisions) from damaging or rupturing the $CO_2$ compressor 108. In some embodiments, the $CO_2$ compressor 108 may be surrounded by the sorbents 106 to provide additional protection from impacts. In some embodiments, one or more sorbents 106 may be positioned within the hood of the cabin 12 and at least partially surround the engine of the vehicle 10 in order to provide $CO_2$ capture capabilities to air flow through the hood of the vehicle 10 and/or to at least partially protect the engine from impacts (e.g., by providing impact attenuation and/or absorption).

The $CO_2$ capture device 100 may include one or more $CO_2$ storage devices or structures for storing the captured $CO_2$. For example, the $CO_2$ capture device 100 may include one or more $CO_2$ storage containers 110 positioned within the container 102 and in fluid communication with the $CO_2$ compressor 108. For example, there may be one or more tubes or pipes connecting the $CO_2$ compressor to the $CO_2$ storage containers 110. As such, the $CO_2$ compressor 108 may compress captured $CO_2$ received from the sorbents 106 and transmit the compressed $CO_2$ to the $CO_2$ storage containers 110. In some embodiments, there are a plurality of $CO_2$ storage containers 110 positioned within the container 102. For example, there may be between one to forty $CO_2$ storage containers 110 positioned within the container 102. In some embodiments, the $CO_2$ compressor 108 may selectively transfer compressed $CO_2$ to individual $CO_2$ storage containers 110. For example, the $CO_2$ compressor 108 may transfer compressed $CO_2$ to a first $CO_2$ storage container 110 until a predetermined amount of compressed $CO_2$ is stored therein and transfer additional compressed $CO_2$ to a second $CO_2$ storage container 110 and so on. In some embodiments, each of the $CO_2$ storage containers 110 is accessible at an exterior surface of the container 102 such that captured compressed $CO_2$ may be transferred to an external storage device easily. For example, the compressed $CO_2$ may be transferred from the storage containers 110 to a permanent storage device or system external to the container 102. The permanent storage device or system may be a facility configured to perform a $CO_2$ sequestration process for sequestering cement, releasing captured $CO_2$ into a closed greenhouse and/or transforming the $CO_2$ into a 3-D printer filament.

In this manner, the $CO_2$ capture device 100 of the present disclosure provides substantial improvements over conventional $CO_2$ capture facilities and other devices. For example, by providing a transportable, or mobile, $CO_2$ capture device 100 as disclosed herein, $CO_2$ capture is easily accomplished in areas of high $CO_2$ generation where it is difficult to build static facilities (e.g., DAC buildings or static structures). Furthermore, the $CO_2$ capture device 100 is more easily scaled to meet increasing needs for $CO_2$ capture than traditional DAC buildings. For example, in the event a DAC building would need to be scaled to increase its $CO_2$ capture capabilities, additional infrastructure would need to be built. However, the $CO_2$ capture device 100 of the present disclosure can be easily scaled through the use of multiple vehicles 10 having $CO_2$ capture devices attached thereto.

In some embodiments, the carbon dioxide sorbents 106 may be selectively adjustable between an activated configuration and a deactivated configuration to selectively control airflow to the carbon dioxide sorbents 106 individually or in combination. In the activated configuration, a sorbent 106 may be in fluid communication with ambient air flowing into the container 102 to allow the sorbent 106 to actively capture $CO_2$ from the ambient air. In the deactivated configuration, ambient air flowing into the container 102 may be prevented from contacting the sorbent 106 thereby preventing the sorbent 106 from capturing $CO_2$. For example, one or more sorbents 106 may be placed within a sorbent container having one or more devices or structures for restricting airflow to the sorbents 106. As such, in the activated configuration, the sorbent container may allow airflow to the sorbents 106 and in the deactivated configuration the container may prevent airflow to the sorbents 106. In some embodiments, each sorbent 106 is adjustable between the activated and deactivated configuration independent of each other sorbent 106. For example, each sorbent 106 may be housed within a separate sorbent container thereby allowing airflow to be selectively restricted to each sorbent 106 independent of one another. Further to this example, there may be a first sorbent 106 and a second sorbent 106 that are configured to transition between the activated and deactivated configuration independent of one another. In some embodiments, the sorbent container housing the sorbents 106 may be configured to selectively restrict airflow (e.g., allow or prevent) separate from or based on other associated processes of the $CO_2$ capture device 100 such as, but not limited to, the separation of captured $CO_2$ from sorbents 106 and/or the compression of the released $CO_2$.

In some embodiments, there may be a sorbent release 112 configured to selectively cause a sorbent 106 to release captured $CO_2$. In some instances, the sorbent release 112 is configured to cause the sorbent 106 to release captured $CO_2$ to the $CO_2$ compressor while the sorbent 106 is in the deactivated configuration a sorbent 106. For example, in the deactivated configuration ambient airflow to the sorbent 106 may be restricted and the sorbent release 112 causes sorbent 106 to transfer captured $CO_2$ to the $CO_2$ compressor 108. The sorbent release 112 may be any device, structure, material, substance or combination thereof for effecting the release of $CO_2$ based on the type of sorbent 106. For example, in instances where the sorbent 106 is a moisture swing sorbent that when wetted releases captured $CO_2$ and when dry captures $CO_2$ the sorbent release 112 may include a fluid container positioned within the container 102 and configured to contain a fluid which the sorbents 106 may at least partially be submerged in. In such instances, the sorbent release 112 fluid container may contain one or more fluids (e.g., water) for wetting the sorbents 106 to cause the sorbents 106 to release any captured $CO_2$. In some embodiments, the sorbent release 112 fluid container includes one or more pumps and/or fluid conduits 114 in fluid communication with the sorbents 106 such that fluid contained within the fluid container 112 may be selectively transferred to a sorbent 106. In some embodiments, the fluid container includes a number of pumps and/or fluid conduits 114 equal to the number of sorbents 106. In this manner, each sorbent 106 may be selectively wetted to cause $CO_2$ release independent of one another. In some embodiments, the sorbent release 112 may include one or more temperature controlling devices configured to increase and/or decrease the temperature of fluids contained within the fluid container. In this manner, the fluids may be heated or cooled to a specific temperature before being transferred to a sorbent 106.

In embodiments where the sorbent 106 is a type other than a moisture swing sorbent, the corresponding sorbent release 112 may be configured to meet the requirements for the release of $CO_2$ therefrom. For example, in an instance where the sorbent 106 is a thermal regenerative sorbent (e.g., a thermal swing sorbent) the corresponding sorbent release 112 may include heating and/or cooling elements configured to be selectively controlled to heat and/or cool the sorbent 106 thereby causing the absorption/adsorption and release of $CO_2$ therefrom. In some instances, the $CO_2$ capture device includes a plurality of different types of sorbents 106 each of which having a corresponding sorbent release 112. Different sorbents 106 may include unique operating and safety requirements and as such, the $CO_2$ capture device 100 may include the equipment and/or devices necessary to meet those requirements.

In some embodiments, the $CO_2$ capture device 100 may include a controller 116 configured to automatically control the functionalities of one or more of the air intake 104, sorbents 106, $CO_2$ compressor 108, $CO_2$ storage containers 110, and the sorbent release 112 described above. For example, the controller 116 may be configured to restrict airflow from the air intake 104 may automatically opening or closing any airflow restriction structures or devices coupled to the air intake 104. Similarly, the controller 116 may be configured to automatically adjust the sorbents 106 between the activated and deactivated configurations. The controller 116 may be configured to selectively activate or deactivate the $CO_2$ compressor 108, cause the $CO_2$ compressor 108 to selectively transfer compressed $CO_2$ to one or more of the $CO_2$ storage containers 110 and/or to monitor a state of the one or more $CO_2$ storage containers 110 (e.g., measure an amount of stored $CO_2$ contained therein). The controller 116 may include, but not limited to, one or more processors, application specific integrated circuits, and microprocessors.

In some embodiments, the controller 116 may be configured to monitor a state of the sorbents 106 and transition the sorbents 106 between the activated and deactivated configurations based on the monitored state. For example, there may be one or more sensors (not shown) positioned within the container and configured to transmit data relating to a state of one or more of the sorbents 106 to the controller 116. The sensors may be configured to measure one or more of the temperature, humidity, and moisture directly from the sorbents 106 and transmit the measured values to the controller 116. The sensors for measuring and/or monitoring sorbents 106 may include, but are not limited to, temperature sensors, humidity sensors and/or moisture sensors. In some embodiments, the sensors are configured to actively measure the sorbents 106 positioned within the container 102 as a whole. Put another way, the sensors may transmit data that is not specific to a single sorbent 106 but rather the entire system of sorbents 106 to the controller 116. In other embodiments, there may be at least one sensor for each sorbent 106 and the controller 116 may receive data from the sensors that is specific to each individual sorbent 106. In a further embodiment, there are one or more sensors for gathering measurements relating to a subset of sorbents 106. In any of the above embodiments, the controller 116 may determine based on the data received from the one or more sensors one of the following states of the sorbents 106: 1) release captured $CO_2$, 2) capture $CO_2$, or 3) continue to capture $CO_2$. It will be understood that the states of the sorbents 106 may be specific to an individual sorbent 106, to the entirety of the sorbents 106, or to a subset of sorbents included in the $CO_2$ capture device 100.

In response to the controller 116 determining that a sorbent should release captured $CO_2$, the controller 116 may automatically cause the sorbent 106 to transition from the activated configuration to the deactivated configuration. The controller 116 may cause airflow to be restricted to the sorbent 106 by at least one of restricting airflow at the air intake 104 and/or restricting airflow to an individual sorbent 106. For example, the controller 116 may automatically cause an airflow restriction structures or devices coupled to the air intake 104 to close thereby preventing further airflow into the entire container 102 and/or the controller 116 may automatically cause airflow through a specific container housing a specific sorbent 106 to be prevented. The controller 116 may cause an interaction between the sorbent release 112 and sorbent 106 to affect the release of captured $CO_2$ therefrom. For example, in an instance where the sorbent 106 is a moisture swing sorbent, the controller 116 causes the fluid contained within the sorbent release 112 fluid container to be pumped via pumps 114 to the sorbents 106 thereby wetting the sorbents 106. The wetted sorbents 106 may release the captured $CO_2$. The controller 116 may further cause the sorbents 106 to transmit captured $CO_2$ to the $CO_2$ compressor 108. For example, the controller 116 transmits a signal to a device controlling the movement of a valve to cause it to open to allow captured $CO_2$ to be transmitted to the $CO_2$ compressor 108. In some instances the valve may be replaced with any other fluid restriction structures or devices between the $CO_2$ compressor 108 and sorbent 106. The controller 116 may be configured to actively monitor the $CO_2$ compression occurring within the $CO_2$ compressor 108 and cause the $CO_2$ compressor to transmit compressed $CO_2$ to the $CO_2$ storage containers 110.

In response to the controller 116 determining that a sorbent is ready for capturing $CO_2$, the controller 116 may cause the sorbent 106 to transition from the deactivated configuration to the activated configuration. Transitioning from the deactivated configuration to the activated configuration may include ceasing an interaction between the sorbent release 112 and sorbent 106. Further to the above example, transitioning to the activated configuration may include, via the controller 116, automatically draining the fluid used to wet the sorbent 106 back into the fluid container. Furthermore, the controller 116 may be configured to automatically allow ambient air to flow over the sorbent 106. For example, airflow that was restricted while the sorbent 106 was in the deactivated configuration may be unrestricted automatically via the controller 116. Further to this example, the controller 116 may automatically cause an airflow restriction structures or devices coupled to the air intake 104 to open thereby allowing airflow into the container 102 and/or the controller 116 may automatically cause airflow through a specific sorbent container housing a specific sorbent 106 to be allowed. In some embodiments, the sorbents 106, while ambient air passing through the air intake contacts the sorbents 106 causes the sorbents 106 to dry to allow the sorbent to being capturing $CO_2$.

In response to the controller 116 determining that a sorbent can and/or should continue to capture $CO_2$ from the ambient air, the controller 116 may not transition the sorbent from the activated configuration to the deactivated configuration. In such instances, the controller 116 may continue to receive data from the one or more sensors monitoring the sorbents 106 and continue to determine the state of the sorbents 106. Although the sorbents 106 described above are moisture swing sorbents, it will be understood that one or more different types of sorbents may be included in the $CO_2$ capture device 100. For example, one or more moisture swing sorbents and one or more electro-swing cell sorbents may be included in the $CO_2$ capture device 100. In some embodiments, different types of sorbents 106 may be positioned at different locations within the container 102. For example, moisture swing sorbents may be positioned opposite electro-swing cell sorbents (e.g., at a top and bottom of the container 102).

In some embodiments, the sorbent 106 may be an electro-swing cell sorbent. In embodiments, where the sorbent 106 is an electro-swing cell sorbent, there may be one or more electrical connections between the electro-swing sorbents and a power supply (e.g., power supply 118) of the $CO_2$ capture device 100 for applying varying voltages to the electro-swing cell sorbent to selectively cause the capture and release of $CO_2$. In this manner, the power supply 118 and electrical connections to the sorbent 106 may act as the sorbent release 112. The controller 116 may be configured to monitor the electro-swing cell sorbent to determine, for example, if any gas leaks out of a container housing the electro-swing cell sorbent. It will be understood that the rate of air intake and/or structures for filtering debris from ambient air may be changed based on the specific electroswing cell sorbent used. In other embodiments, the sorbent 106 may be a humidity swing sorbent.

In some embodiments, one or more sorbents 106 may be in the activated configuration while one or more other sorbents 106 are in the deactivated configuration. For example, a first subset of sorbents 106 in the active configuration may be capturing $CO_2$ from ambient air flowing through the air intake 104 while a second subset of sorbents 106 in the deactivated configuration release captured $CO_2$ to the $CO_2$ compressor 108 for compression and storage. In this manner, the $CO_2$ capture device 100 of the present disclosure may constantly, or nearly constantly, be capturing $CO_2$ from ambient air. In such embodiments, the first subset of sorbents 106 may be fluidly isolated from the second subset of sorbents 106. For example, the airflow through the air intake 104 may be split between the first and second subsets of sorbents 106. In other embodiments, each of the sorbents 106 is in the activated configuration and deactivated configuration at generally the same time as each other sorbent 106. In this manner, the $CO_2$ capture device 100 may cycle between periods of $CO_2$ capture and periods of $CO_2$ compression and storage.

In some embodiments, there may be one or more additional sensors in communication with the controller 116 for monitoring the state of fluids contained within the fluid container of the sorbent release 112. For example, there may be one or more sensors for transmitting data related to the temperature and/or pH level of fluids contained within the fluid container to the controller 116. In some embodiments, there may be one or more sensors in communication with the controller 116 for monitoring airflow external to the container 102 and/or airflow through the air intake 104. In some embodiments, the controller 116 may be configured to optimize the $CO_2$ capture, compress and release cycle of the $CO_2$ capture device 100 based on one or more of the data related to the temperature and/or pH level of fluids within the fluid container and/or the data relating to the airflow through the air intake 104. For example, if the vehicle 10 is moving faster than a predetermined amount (e.g., moving too fast, moving faster than 100 mph), the controller 116 may determine that the airflow through the air intake 104 is at a rate that would likely cause damage to the sorbents 106 and may close the air intake 104 to prevent damage to the sorbents 106. Furthermore, the controller 116 may receive the pH level and/or temperature of fluids contained within the fluid container and determine, based on the pH level and/or temperature, an optimal time to wet the sorbents 106 with the fluid for release of captured $CO_2$.

In some embodiments, $CO_2$ capture device 100 may include one or more power sources 118 positioned within the container 102 for providing power to one or more components included therein. For example, there may be one or more power sources 118 in electrical communication with the controller 116, $CO_2$ compressor 108, fluid pumps 114 and/or the vehicle 10. In some embodiments, there may be a power inverter 120 in electrical communication with the power source 118. In some embodiments, there may be one or more fans coupled to the air intake 104 for drawing air into the container 102. In other embodiments, the $CO_2$ capture device 100 includes no fans and generates airflow through the air intake solely through initiating movement of the vehicle 10. In some embodiments, the container 102 includes an air outlet at the rear of the container 102, opposite the air intake 104 for releasing cleaned air back into the environment. Cleaned air may refer to air within the container 102 that has had carbon captured by the sorbents 106. In some embodiments, the air outlet includes one or more airflow restricting structures or devices, similar to the air inlet 104, that may be selectively controlled by the controller 116. In some embodiments, the fluid container of the sorbent release 112 includes one or more fluid inlets and/or fluid outlets accessible at an exterior of the container 102 for dumping and refilling the fluids contained therein to and from an external source.

As mentioned above, the vehicle 10 may be an electric vehicle having one or more electric motors for causing movement of the vehicle 10. However, in other embodiments, the vehicle 10 may be a gasoline powered vehicle including a combustion engine or a hybrid vehicle powered by a combination of a combustion engine and electric motors. In such instances where the vehicle 10 is not an electric vehicle (e.g., a gasoline or hybrid vehicle), the vehicle 10 may generate and emit $CO_2$ during use through an existing exhaust system.

As such, in some embodiments, the exhaust system of the $CO_2$ emitting vehicle may be in fluid communication with the $CO_2$ capture device 100 such that $CO_2$ emitted by the vehicle 10 during use is at least partially captured and stored in the $CO_2$ storage containers. For example, the exhaust system may be in fluid communication with the $CO_2$ compressor 108. Although the exhaust system may be in fluid communication with the $CO_2$ compressor 108, the container 102 may still be separated from the exhaust system, or put another way, the container 102 is not positioned within and/or contained within and is external to the exhaust system of the vehicle 10. Similarly, the sorbents 106 may be separate from the exhaust system of the vehicle 10. In this manner, the vehicle 10 including the $CO_2$ capture device 100 of the present disclosure may capture more $CO_2$ than it generates.

In some embodiments, the $CO_2$ capture device 100 may include one or more $CO_2$ converting devices positioned within the container 102 for converting the captured $CO_2$ into one or more predetermined usable forms. For example, there may be a converting device configured to convert the captured $CO_2$ into a form of portlandite or concrete. The $CO_2$ converting devices may be in fluid communication with the $CO_2$ compressor 108 such that at least a portion of compressed $CO_2$ is transferred to the $CO_2$ conversion device. In other embodiments, the $CO_2$ conversion device may be in fluid communication with the $CO_2$ storage device 110 such that compressed $CO_2$ may be selectively transferred from the $CO_2$ storage device(s) 110 to the $CO_2$ conversion device. In some embodiments, there may be one or more other material containers coupled to or included in the $CO_2$ conversion device that contain materials required to convert the $CO_2$.

In some embodiments, there may be one or more temperature control devices (e.g., HVAC units) coupled to the container 102 and configured to control the temperature within the container 102 and/or within sorbent containers housing the sorbents 106. In this manner, in the event the outside weather is extreme such as a heatwave or freezing weather the temperature control devices may be activated to prevent the sorbents and/or any other components of the $CO_2$ capture device 100 from being damaged by going out of its operational temperature ranges. In some embodiments, the temperature control device may be provided with the vehicle 10. In some embodiments, the temperature control device 10 may be separate from a temperature control device that is used to regulate the temperature inside the cabin 12.

Figure 2:
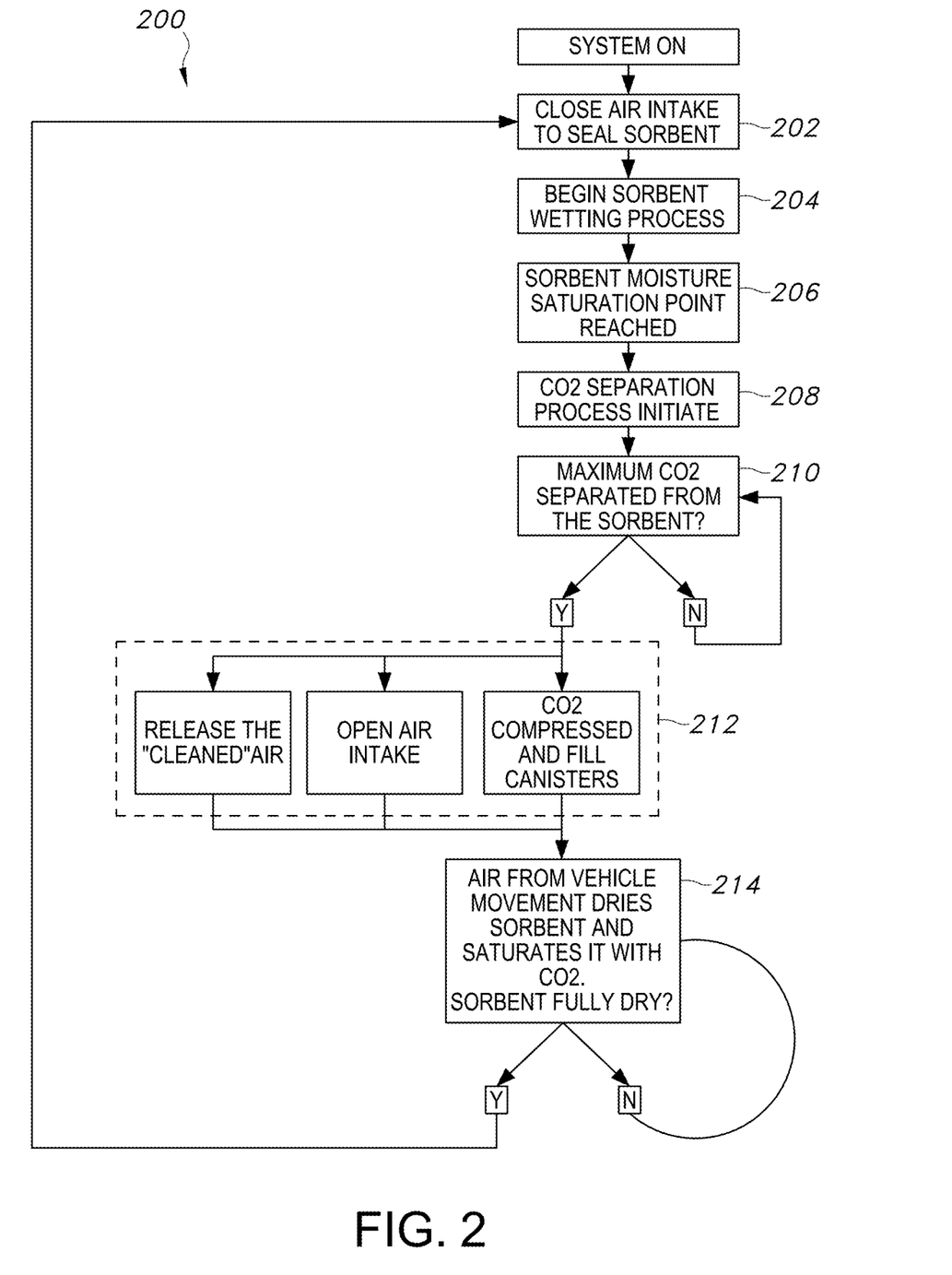
FIG. 2 is a flowchart illustrating a method of capturing carbon dioxide using the vehicle and transportable carbon dioxide capture device of FIG. 1A.

Referring to FIG. 2, there is illustrated a flowchart depicting a method, generally designated 200, of capturing carbon dioxide using the vehicle 10 and $CO_2$ capture device 100 attached thereto, in accordance with an exemplary embodiment of the present disclosure. Prior to the method 200, the $CO_2$ capture device 100 and the sorbents 106 included therein may already be actively capturing, compressing and storing $CO_2$. For example, prior to the method 200, movement of the vehicle 10 may be initiated such that ambient air external to the container 102 flows through the at least one air intake 104, into the container 102, and contacts the at least one carbon dioxide sorbent 106 causing the at least one carbon dioxide sorbent 106 to automatically capture carbon dioxide from the ambient air within the container 102. It will be understood that the following steps of the method 200 may be automatically facilitated by the controller 116 as described above.

The method 200 may include the step 202 of closing off, or restricting, air intake to the sorbents 106. For example, as described above, the airflow at the air intake 104 and/or to a specific sorbent 106 may be prevented thereby sealing the sorbent 106 from ambient air and preventing any further $CO_2$ capture at the sorbent 106. The method 200 may include the step 204 of beginning to wet the sorbent. For example, fluid contained within the fluid container of the sorbent release 112 may be pumped to one or more sorbents 106 to begin wetting the sorbents 106. The method 200 may include the step 206 of reaching a sorbent moisture saturation point. For example, the sorbents 106 may be moisture swing sorbents that require a minimum saturation before $CO_2$ separation, or release, from the sorbent 106 may begin. In some embodiments, the one or more sensors in communication with the controller 116 may be configured to measure the saturation of the sorbents 106, individually or in combination.

The method 200 may include the step 208 of separating $CO_2$ from the sorbents. For example, once the saturation point from step 206 is reached, the sorbents 106 may automatically begin releasing captured $CO_2$. In some embodiments, excess fluid contained within a sorbent container may be transferred back into the fluid container once the saturation point has been reached. In other embodiments, the excess fluid may remain within the sorbent container after the saturation point has been reached. In instances where the sorbent 106 is not a moisture-swing sorbent, the steps 204-208 may be replaced with a step of causing an interaction between the sorbent 106 and the corresponding sorbent release 112 to cause the sorbent 106 to release captured $CO_2$.

The method 200 may include the step 210 of determining whether a maximum amount of $CO_2$ has been separated from the sorbents. For example, the controller 116, in communication with the sensors monitoring the sorbents 106, may determine that a maximum amount of $CO_2$, has been released by a sorbent 106. In other embodiments, instead of a maximum amount being released, step 210 may be a determination that a predetermined amount of $CO_2$ has been released. In response to a determination that the maximum, or predetermined, amount of $CO_2$ has not been released, the method 200 returns to step 210 to continue releasing $CO_2$.

In response to the maximum, or predetermined, amount of $CO_2$ being separated from the sorbent, the method 200 may include the steps 212 of releasing cleaned air to the environment, opening the air intake and compressing the $CO_2$. For example, an air outlet of the container 102 may be opened to allow air from within the container 102, that has had $CO_2$ captured therefrom, to be released into the environment. The air intake 104 may be opened to allow airflow back into the container 102. In other embodiments, sorbent containers housing sorbents 106 in the deactivated configuration may be opened to allow airflow to the sorbents 106. Additionally, the $CO_2$ released by the sorbents 106 may be transferred to the $CO_2$ compressor 108, compressed via the $CO_2$ compressor 108 and transferred from the $CO_2$ compressor to one or more of the $CO_2$ storage containers 110. Furthermore, any excess fluid used to wet the sorbents 106 that is contained within the sorbent container may be transferred back to the fluid container of the sorbent release 112.

The method 200 may include the step 214 of continuing movement of the vehicle to dry and saturate the sorbents with $CO_2$. For example, with airflow coming through the air intake 104 and contacting one or more of the sorbents 106, the sorbents 106 may begin to dry and to begin capturing $CO_2$ from ambient air flowing through the air intake 104. The step 214 may further include determining whether the sorbent has fully dried. For example, the sensors in communication with the controller 116 may transmit data to the controller 116 such that the controller 116 may determine if the sorbent 106 has fully or at least substantially dried. In some embodiments, the controller 116 may determine if a sorbent 106 has dried based on temperature and/or moisture values of the sorbent 106. In some embodiments, there may be a predetermined threshold relating to the temperature and/or moisture of the sorbent 106 before the controller 116 is configured to determine that the sorbent 106 has sufficiently dried. In response to the sorbent not being sufficiently dried, the method 200 returns to step 214 after a predetermined time delay in the order of minutes and/or hours. In response to the sorbent being sufficiently dried, the method 200 may return to step 202.

It will be understood that the steps of method 200 may be repeated any number of times to continue to capture, release, compress and store $CO_2$ via the $CO_2$ capture device 100 of the present disclosure. The method 200 illustrates the $CO_2$ capture device 100 of the present disclosure cycling between periods of $CO_2$ capture (e.g., step 214) and periods of $CO_2$ release, compression and storage (e.g., steps 202-212). However, it will be understood that the method 200 may apply to a single sorbent 106 or to a subset of sorbents 106 (e.g., a first or second subset) wherein the $CO_2$ capture device 100 is configured to constantly, or nearly constantly, be capturing $CO_2$. For example, and as discussed above, a first subset of sorbents 106 may be in the activated configuration (e.g., step 214) while a second subset is in the deactivated configuration (e.g., steps 202-210, steps 202-212) thereby allowing the $CO_2$ capture device 100 to be substantially continuously capturing $CO_2$.

Figure 3:
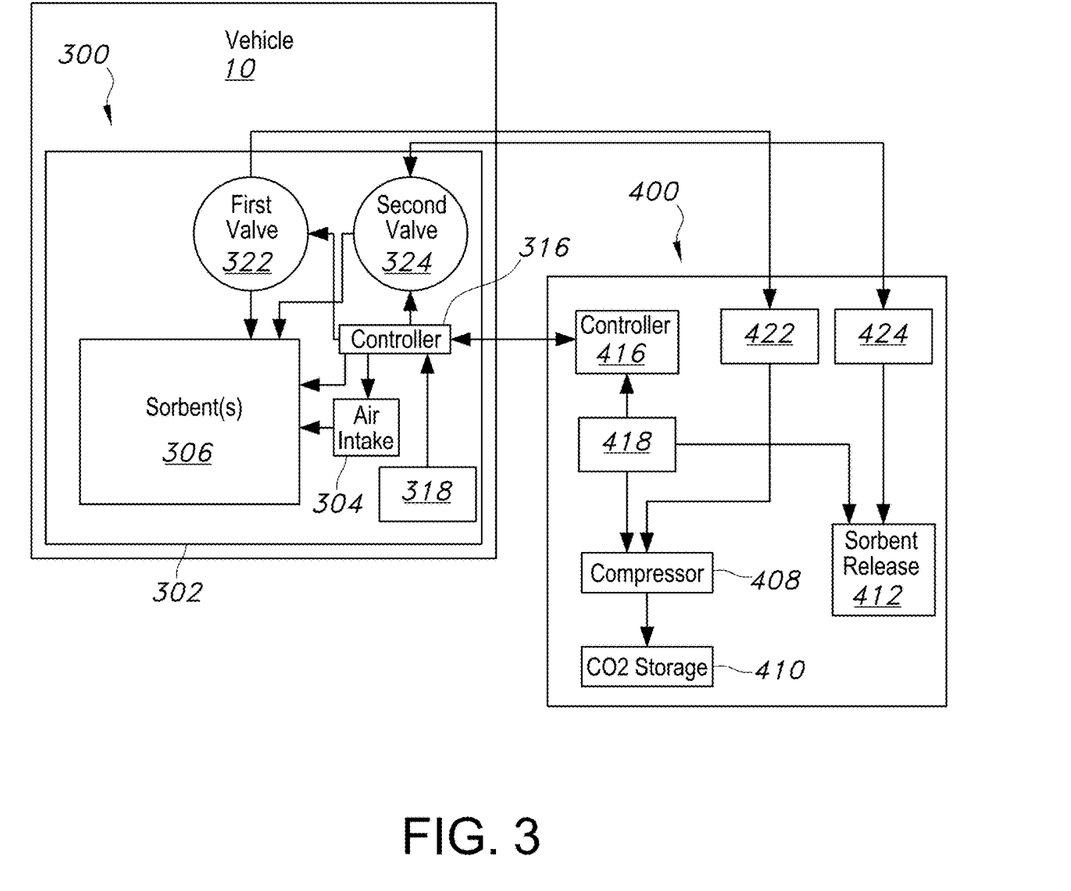
FIG. 3 is a schematic diagram of a vehicle including a transportable carbon dioxide capture device and an external carbon dioxide storage device in accordance with another exemplary embodiment of the present disclosure.

Referring to FIG. 3, there is shown a schematic diagram of a transportable carbon dioxide capture device, generally designated 300, and an external carbon dioxide storage device, generally designated 400, for storing $CO_2$ captured via the $CO_2$ capture device 300. The $CO_2$ capture device 300 may be generally similar to the $CO_2$ capture device 100 described above with reference to FIGS. 1A-2, however the $CO_2$ capture device 300 may not include a compressor, fluid container, and/or $CO_2$ storage devices for storing compressed $CO_2$. The $CO_2$ capture device 300 may be configured to be detachably coupled to the $CO_2$ storage device 400 such that $CO_2$ captured by the $CO_2$ capture device 300 may be transferred to the $CO_2$ storage device 400 for storage. For example, when coupled to one another the $CO_2$ capture device 400 and the $CO_2$ storage device 300 may be in fluid communication with one another to allow captured $CO_2$ to be transferred from the $CO_2$ capture device 300 to the $CO_2$ storage device 400. In some embodiments, the $CO_2$ storage device 400 is a device external to the vehicle 10 and/or the $CO_2$ capture device 300. For example, the $CO_2$ storage device 400 may be a stationary structure such as, but not limited to, an electric vehicle charging station, a fuel pump, or a $CO_2$ capture and storage facility (e.g., a DAC building). In some embodiments, there may be a facility or structure that houses a plurality of $CO_2$ storage devices 400 to allow for a plurality of $CO_2$ capture devices to be coupled thereto. In some embodiments, a single $CO_2$ storage device 400 may be configured to couple to two or more $CO_2$ capture devices 300 simultaneously to allow for simultaneous transfer of captured $CO_2$ to the $CO_2$ storage device 400. In some embodiments, the $CO_2$ storage device 400 may be transportable. For example, one or more $CO_2$ storage devices 400 may be coupled to a vehicle (e.g., truck, semi, van, box truck, electric vehicle).

The $CO_2$ capture device 300 may be transportable in that the $CO_2$ capture device 300 may be easily attached to or coupled to an existing vehicle 10. The vehicle 10 may be generally the same as the vehicle 10 described above with reference to FIG. 1A-1B. In some embodiments, the vehicle 10 for use with the $CO_2$ capture device 300 is a standard sized vehicle (e.g., a sedan, hatchback, roadster, CUV, SUV, Pickup truck, coupe, van) upon which the $CO_2$ capture device 300. For example, the $CO_2$ capture device 300 and the components thereof may be housed within a container 302 or housing similar to the container 102 described above.

The $CO_2$ capture device may include one or more air intakes 304, one or more sorbents 306, a controller 316, and at least one power source 318 each being generally the same as the air intake 104, sorbents 106, controller 116 and power source 118 described above with reference to FIGS. 1A-2. The sorbents 306 may be housed within individual sorbent containers and/or positioned within a single sorbent container. The air intake 304 may be configured to allow ambient air external to the vehicle 10 and container 302 to enter into the container 302 in generally the same manner as air intake 104 described above. In some embodiments, the air intake 304 is coupled to the container 302 and is in fluid communication with ambient air and an interior space of the container 302. In this manner, ambient air may enter into the container 302 via the air intake 304 and the one or more sorbents 306 may capture $CO_2$ in generally the same manner as the $CO_2$ capture device 100 described above. In other embodiments, the air intake 304 is an existing air intake of the vehicle 10. For example, the air intake 304 may be the air intake at the hood of the vehicle 10.

The $CO_2$ capture device 300 may include at least one valve for transferring captured $CO_2$ to the $CO_2$ storage device 400. For example, the $CO_2$ capture device 300 may include a first valve 322 in fluid communication with the one or more sorbents 306 for transferring $CO_2$ released by the sorbents 306 to a device or structure (e.g., the $CO_2$ storage device) external to the container 302. There may be one or more pipes or other fluid conduits coupling the first valve 322 to the sorbents 306 and to an external surface of the container 302. In some embodiments, the first valve 322 may be selectively opened or closed by the controller 316 to allow or prevent the flow of $CO_2$ through the valve 322. There may be one or more sensors (e.g., temperature sensors, moisture sensors, airflow sensors) in communication with the controller 316 and configured to monitor a state of the sorbents 306 and/or ambient air within the container 302 in generally the same manner as the sensors described above with reference to FIGS. 1A-2. In some embodiments, the controller 316 may be configured to determine that the sorbent 306 has reached a maximum limit of captured $CO_2$ and transmit an indication to the user (e.g., via the vehicle 10, a smart device in communication with controller 316) that $CO_2$ release is suggested and/or required.

The $CO_2$ storage device 400 may include one or more $CO_2$ storage containers 410 for storing $CO_2$ captured via the sorbents 306 of the $CO_2$ capture device 300. The $CO_2$ storage containers 410 may be generally the same as the $CO_2$ storage containers 110 discussed above. In some embodiments, the $CO_2$ storage containers 410 may be in fluid communication with the sorbents 306 via the first valve 322 when the $CO_2$ capture and storage devices 300, 400 are coupled to one another. In some embodiments the $CO_2$ storage device 400 includes at least one $CO_2$ compressor 408 configured to receive and compress $CO_2$ captured by the $CO_2$ capture device 300. The $CO_2$ compressor 408 may be generally the same as the $CO_2$ compressor 108 discussed above. The $CO_2$ compressor 408 may be in fluid communication with the one or more $CO_2$ storage containers 410 such that the $CO_2$ compressor 408 may transfer compressed $CO_2$ to the one or more $CO_2$ storage containers 410.

In some embodiments, the $CO_2$ storage device 410 may include a $CO_2$ inlet 422 in fluid communication with the $CO_2$ compressor 408 and configured to fluidly couple the $CO_2$ compressor 408 to the sorbents 308 when the $CO_2$ capture and storage devices 300, 400 are coupled to one another. In this manner, $CO_2$ capture and storage devices 300, 400 are coupled to one another, captured $CO_2$ may be released from the sorbents 306 through the first valve 322 and the $CO_2$ inlet 422 to the $CO_2$ compressor 408. In some embodiments, the $CO_2$ storage device 400 may include one or more materials and/or devices configured to cause the sorbent 306 to release captured $CO_2$. The $CO_2$ storage device 400 may include a sorbent release 412 configured to cause the sorbent 306 to release capture $CO_2$. For example, the sorbents 306 may be moisture swing sorbents and the sorbent release 412 may contain a fluid (e.g., water) for wetting the sorbent 306 to cause the sorbent 306 to release captured $CO_2$. The sorbent release 412 may be generally the same as the sorbent release 112 discussed above. For example, the sorbent release 412 may include a fluid container and one or more pumps for pumping fluid from the container to the one or more sorbents 306.

The fluid container of sorbent release 412 may be in fluid communication with the sorbents 306 when the $CO_2$ capture and storage devices 300, 400 are coupled to one another. For example, the $CO_2$ capture device 300 may include a second valve 324 configured to selectively restrict fluid flow between the sorbents 306 and the fluid container. Similarly, the $CO_2$ storage device 400 may include a fluid inlet/outlet 424 for allowing fluids to be transferred between the sorbents 306 and the fluid container. For example, fluid contained within the container of the sorbent release 412 may be pumped through the fluid inlet/outlet 424, travel through the second valve 324 and be deposited on the sorbent 306. Similar to the $CO_2$ capture device 100 discussed above, the sorbents 306 may be positioned within a container for containing the fluid pumped to the sorbents 306 from the fluid container. In this manner, when $CO_2$ capture and storage devices 300, 400 are coupled to one another the $CO_2$ storage device 400 may cause the sorbents 306 to release captured $CO_2$. Furthermore, excess fluids contained within the sorbent container may be deposited back to the fluid container following wetting of the sorbent 306. In some embodiments, the controller 316 may be configured to control opening and closing of the second valve 324 to selectively restrict fluid flow between the sorbents 306 and the fluid container.

In some embodiments, the $CO_2$ storage device 400 may include a controller 416 similar to the controller 316 and controller 116. The controller 416 may be configured to selectively control operation of the $CO_2$ compressor 408, sorbent release 412, the $CO_2$ inlet 422, fluid inlet/outlet 424 and/or the $CO_2$ storage containers 410. For example, the controller 416 may selectively activate and/or deactivate the $CO_2$ compressor 408 and/or cause the fluid container of the sorbent release 412 to pump fluids contained therein to the sorbent 306. There may be one or more sensors in communication with the controller 416 and configured to monitor and transmit data relating to a state of any one of the $CO_2$ compressor 408, sorbent release 412 and $CO_2$ storage container 410, to the controller 416. The $CO_2$ inlet 422 and the fluid inlet/outlet 424 may include one or more valves that are selectively opened/closed by the controller 416. There may be a power source 418 included in the $CO_2$ storage device 400 and configured to power the controller 416, $CO_2$ compressor 408 and/or the sorbent release 412.

In some embodiments, the controller 416 may be in communication with the controller 316 when the $CO_2$ capture and storage devices 300, 400 are coupled to one another. In this manner, the controllers 316, 416 may communicate with one another to automatically initiate transfer of captured $CO_2$ from the $CO_2$ capture device 300 to the $CO_2$ storage device 400 when the $CO_2$ capture and storage devices 300, 400 are coupled to one another. For example, a user may initiate movement of the vehicle 10 causing the $CO_2$ capture device 300 to capture $CO_2$ from ambient air entering into the container 302 via air intake 304. After a period of time, the sorbent 306 may have captured an amount of $CO_2$ from the ambient air and the user may drive the vehicle to a location where the $CO_2$ storage device 400 is located. The $CO_2$ capture and storage devices 300, 400 may be coupled to one another (e.g., manually via a charging cable, charging dock, fluid and/or $CO_2$ transfer conduits) and the controllers 316 and 416 may communicate with one another to initiate a transfer of the captured $CO_2$. In some embodiments, transfer of the captured $CO_2$ may include, at the controller 316, opening the second valve 324 and at the controller 416 causing the fluid container of the sorbent release 412 to pump a predetermined amount of a fluid contained therein to the sorbents 306.

In response to the sorbents 306 being wetted by the fluid, the controller 324 may cause the second valve to close 324 and may cause the first valve to open 322 to allow $CO_2$ being released by the wetted sorbent 306 to be transferred to the compressor 408. In response to the compressor 408 receiving the released $CO_2$, the controller 416 may cause the compressor 408 to activate, thereby compressing the released $CO_2$. The compressor 408 may, during or after compression of the released $CO_2$, transfer the compressed $CO_2$ to the $CO_2$ storage container 410. The controller 316 may be configured to determine that a predetermined amount of captured $CO_2$ has been released from the sorbent 306 and may transmit an indication of such to the controller 416. The predetermined amount of released $CO_2$ from the sorbent 306 may be any desired amount corresponding to the sorbent 306 being capable of capturing an additional amount of $CO_2$. Put another way, the predetermined amount of released $CO_2$ may be used as an indication that the sorbent 306 and the $CO_2$ capture device 300 are ready to initiate another cycle of capturing $CO_2$ from ambient air. The predetermined amount may be the maximum amount of released $CO_2$ or a percentage thereof (e.g., between about 50% to about 95% of the maximum amount).

In response to the controller 316 determining that a predetermined amount of $CO_2$ has been released, the controller 316 may cause the second valve 324 to open such that excess fluid used to wet the sorbent 306 may be transferred back to the fluid container of the sorbent release 412. In other embodiments, the controller 316 may cause excess fluid contained within the sorbent container housing the sorbents 306 to be dumped, via a separate fluid conduit, to the external environment. In this manner, the controllers 316 and 416 may automatically cause the release, compression, and storage of $CO_2$ captured by the $CO_2$ capture device 300. In embodiments where the vehicle 10 is an electric vehicle, the release, compression and storage of $CO_2$ may occur simultaneously with charging the electric vehicle. For example, the nozzle used for charging the vehicle 10 may include a fluid conduit for each of the captured $CO_2$ and the fluid contained within the fluid container for wetting the sorbent 306. Further to this example, the charging nozzle may be coupled to the vehicle such that electric charging is initiated simultaneously with transfer of the $CO_2$ release, compression and storage as described above.

In some embodiments, there may be a plurality of vehicles 10 each having a $CO_2$ capture device 300 coupled thereto and each of the capture devices 300 may be configured to be coupled to one another. For example, there may be ten vehicles 10 each having a separate $CO_2$ capture device 300 coupled thereto for a total of ten $CO_2$ capture devices 300. Each of the ten $CO_2$ capture devices 300 may be fluidly coupled to one another (e.g., via pipes, tubing, hoses) such that a single $CO_2$ capture device 300 may be fluidly coupled to a $CO_2$ storage device 400 to transfer released $CO_2$ from each of the capture devices 300 to the storage device 400. It will be understood that the number of connected $CO_2$ capture devices 300 (e.g., ten) described above is an example and that any number of $CO_2$ capture devices 300 may be fluidly coupled to one another to transfer released $CO_2$. For example, there may be two, three, four, five, six, seven, eight, nine, ten, or more than ten $CO_2$ capture devices 300 fluidly coupled to one another. In other embodiments, the $CO_2$ storage device 400 may include a plurality of $CO_2$ inlets 422 to allow for multiple $CO_2$ capture devices 300 to be fluidly coupled thereto simultaneously. For example, there may be between two to ten $CO_2$ inlets 422, or more than ten $CO_2$ inlets each in fluid communication with the compressor 408. In this manner, multiple $CO_2$ capture devices 300 may be fluidly coupled thereto simultaneously and transfer released $CO_2$ through a respective inlet 422 to the $CO_2$ compressor 408.

It will be appreciated by those skilled in the art that changes could be made to the exemplary embodiments shown and described above without departing from the broad inventive concepts thereof. It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways.

Specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one". Finally, unless specifically set forth herein, a disclosed or claimed method should not be limited to the performance of their steps in the order written, and one skilled in the art can readily appreciate that the steps may be performed in any practical order.

What is claimed is:

1. A transportable carbon dioxide capture device comprising:
an enclosed container configured to be attached to a vehicle, the enclosed container including an air intake in fluid communication with ambient air;
a carbon dioxide sorbent positioned within the enclosed container;
a carbon dioxide compressor positioned within the enclosed container and in fluid communication with the carbon dioxide sorbent; and
a carbon dioxide storage container positioned within the enclosed container and in fluid communication with the carbon dioxide compressor.

2. The transportable carbon dioxide capture device of claim 1, wherein the carbon dioxide sorbent is selectively adjustable between an activated configuration and a deactivated configuration, and
wherein in the activated configuration the carbon dioxide sorbent is in fluid communication with air flowing through the at least one air intake and in the deactivated configuration air flowing through the air intake is prevented from contacting the carbon dioxide sorbent.

3. The transportable carbon dioxide capture device of claim 2, wherein the carbon dioxide sorbent includes a first sorbent and a second sorbent each being configured to transition between the activated and deactivated configurations independent of one another.

4. The transportable carbon dioxide capture device of claim 3 further comprising:
one or more sensors in communication with a controller, the one or more sensors configured to transmit data relating to a state of the first and second sorbent to the controller,
wherein the controller is configured to transition the first and second sorbent between the activated and deactivated configurations based on the state of the first and second sorbents.

5. The transportable carbon dioxide capture device of claim 2, wherein in the deactivated configuration, captured carbon dioxide is transferred from the carbon dioxide sorbent to the carbon dioxide compressor.

6. The transportable carbon dioxide capture device of claim 1 further comprising:
a fluid container positioned within the enclosed container, the fluid container in fluid communication with the carbon dioxide sorbent,
wherein the at least one carbon dioxide sorbent is a moisture swing sorbent.

7. The transportable carbon dioxide capture device of claim 1, wherein the carbon dioxide sorbent includes a plurality of carbon dioxide sorbents each in fluid communication with the carbon dioxide compressor.

8. The transportable carbon dioxide capture device of claim 1, wherein the carbon dioxide storage container includes a plurality of carbon dioxide storage containers each in fluid communication with the carbon dioxide compressor.

9. The transportable carbon dioxide capture device of claim 1, wherein the enclosed container is separated from an exhaust system of the vehicle.

10. A transportable carbon dioxide capture device comprising:
an enclosed container configured to be attached to a vehicle, the enclosed container including an air intake in fluid communication with ambient air and an interior space of the enclosed container;
a plurality of moisture swing sorbents positioned within the enclosed container;
one or more sensors positioned within the enclosed container and in communication with a controller, the one or more sensors configured to transmit data relating to a state of each moisture swing sorbent of the plurality of moisture swing sorbents to the controller, the controller configured to selectively activate and deactivate each of the moisture swing sorbents based on the data received from the one or more sensors;
a fluid container positioned within the enclosed container, the fluid container in fluid communication with the plurality of moisture swing sorbents and configured to selectively pump fluid contained within the fluid container to individual moisture swing sorbents of the plurality of moisture swing sorbents;
a carbon dioxide compressor positioned within the enclosed container and in fluid communication with the plurality of moisture swing sorbents; and
a plurality of carbon dioxide storage containers positioned within the enclosed container and in fluid communication with the carbon dioxide compressor,
wherein when activated the moisture swing sorbents are in fluid communication with air flowing through the at least one air intake and when the moisture swing sorbents are deactivated air flowing through the at least one air intake is prevented from contacting the respective moisture swing sorbent.

11. The transportable carbon dioxide capture device of claim 10, wherein the enclosed container and the plurality of moisture swing sorbents are separated from an exhaust system of the vehicle.

12. A carbon dioxide capture vehicle operable by a user to initiate and control movement of the vehicle, the vehicle comprising:
a cabin having one or more user-operable control units to allow a user to initiate and control movement of the vehicle;
a container coupled to the cabin and positioned at least partially behind the cabin and having a top surface positioned above a roof of the cabin, the container including an air intake in fluid communication with ambient air and an interior space of the container;
a carbon dioxide sorbent positioned within the container;
a carbon dioxide compressor positioned within the container and in fluid communication with the carbon dioxide sorbent; and
a carbon dioxide storage container positioned within the enclosed container and in fluid communication with the carbon dioxide compressor.

13. The vehicle of claim 12, wherein the carbon dioxide sorbent is selectively adjustable between an activated and deactivated configuration, and
wherein in the activated configuration the carbon dioxide sorbent is in fluid communication with air flowing through the air intake and in the deactivated configuration captured carbon dioxide is transferred from the at least one sorbent to the carbon dioxide compressor.

14. The vehicle of claim 13, wherein the carbon dioxide sorbent includes a first sorbent and a second sorbent each being configured to transition between the activated and deactivated configurations independent of one another.

15. The vehicle of claim 14 further comprising:
one or more sensors in communication with a controller, the one or more sensors configured to transmit data relating to a state of the first and second sorbent to the controller,
wherein the controller is configured to transition the first and second sorbent between the activated and deactivated configurations based on the state of the first and second sorbents.

16. The vehicle of claim 12, wherein the vehicle is one of: an electric automobile, an unmanned aerial vehicle, a train, or a boat.

17. The vehicle of claim 12, wherein the at least one air intake is positioned at least partially above the roof of the cabin.

18. A method of operating the vehicle of claim 12 comprising:
initiating movement of the vehicle such that ambient air external to the enclosed container flows through the at least one air intake, into the enclosed container, and contacts the at least one carbon dioxide sorbent causing the at least one carbon dioxide sorbent to automatically capture carbon dioxide from the ambient air within the enclosed container.

19. The method of claim 18 further comprising:
causing the at least one carbon dioxide sorbent to release a first amount of captured carbon dioxide to the carbon dioxide compressor;
automatically compressing the first amount of captured carbon dioxide at the carbon dioxide compressor;
transferring the compressed first amount of captured carbon dioxide to the one or more carbon dioxide storage containers; and
capturing a second amount of carbon dioxide via the at least one sorbent.

* * * * *